United States Patent [19]

Matsuura et al.

[11] Patent Number: 4,868,676
[45] Date of Patent: Sep. 19, 1989

[54] MANUAL COPYING APPARATUS

[75] Inventors: Hirokazu Matsuura, Yamatokoriyama; Shunju Anzai, Nara, both of Japan

[73] Assignee: Shapr Kabushiki Kaisha, Osaka, Japan

[21] Appl. No.: 27,805

[22] Filed: Mar. 19, 1987

[30] Foreign Application Priority Data

| Mar. 19, 1986 | [JP] | Japan | 61-62542 |
| Mar. 20, 1986 | [JP] | Japan | 61-63686 |
| Mar. 20, 1986 | [JP] | Japan | 61-63689 |
| Mar. 31, 1986 | [JP] | Japan | 61-75058 |
| Apr. 9, 1986 | [JP] | Japan | 61-81383 |
| May 15, 1986 | [JP] | Japan | 61-73300[U] |

[51] Int. Cl.$^4$ .............................. H04N 1/21
[52] U.S. Cl. .................... 358/296; 358/474; 346/76 PH
[58] Field of Search ......... 346/76 PH, 160, 145, 346/160.1; 355/135 H, 14; 358/296, 298, 300, 302, 285

[56] References Cited

U.S. PATENT DOCUMENTS 4,562,444 12/1985 Nagashima et al. ............ 346/145

Primary Examiner—E. A. Goldberg
Assistant Examiner—Lincoln Donovan
Attorney, Agent, or Firm—Birch, Stewart, Kolasch & Birch

[57] ABSTRACT

A manual or handy type copying apparatus including an image reading section for reading an image of an original document to be copied, and a printing section for printing the image read by the image reading section onto a transfer material, and arranged to subject the printing section to manual scanning during the printing operation or work, with the printing portion held in contact with the transfer material, and characterized in that there are provided spring members adapted to support the printing portion in a floating state so that the printing portion contacts the transfer material under a constant pressure during the printing operation.

3 Claims, 7 Drawing Sheets

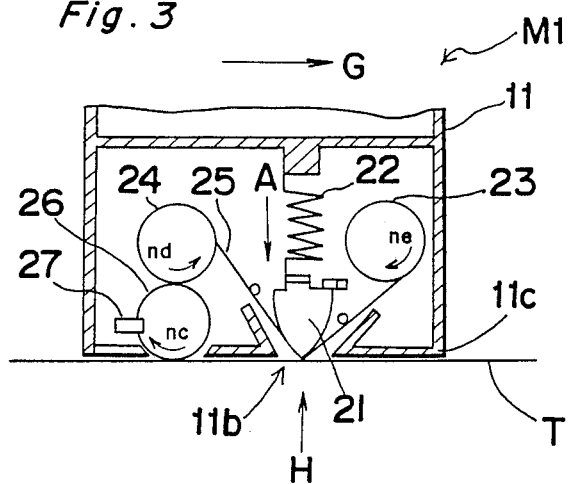
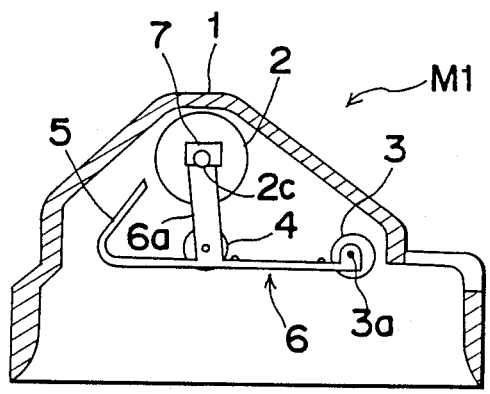
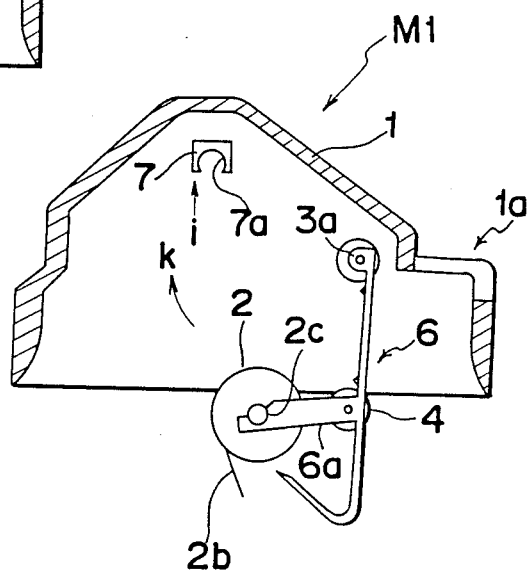

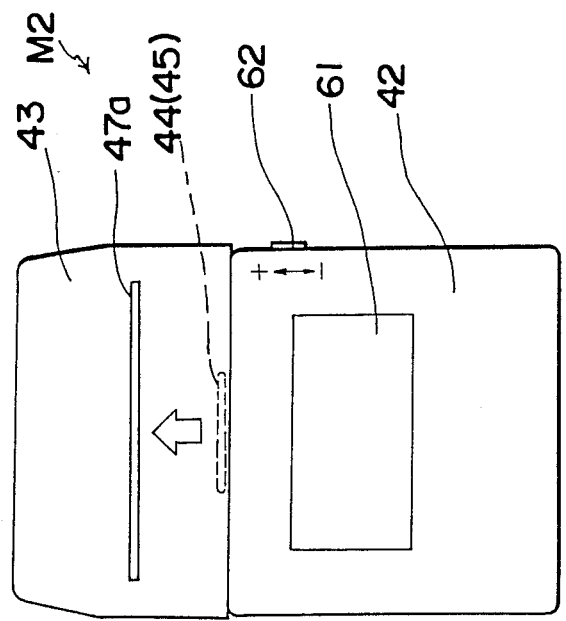
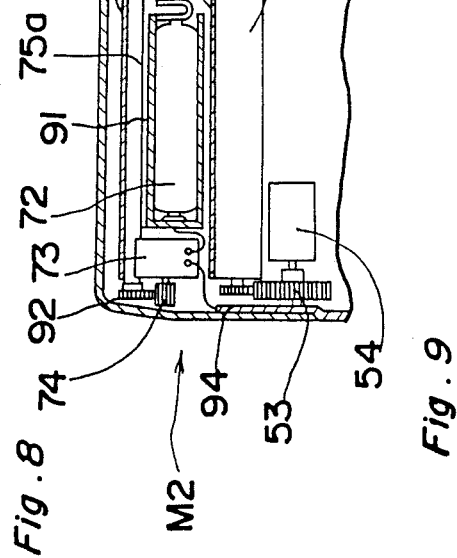
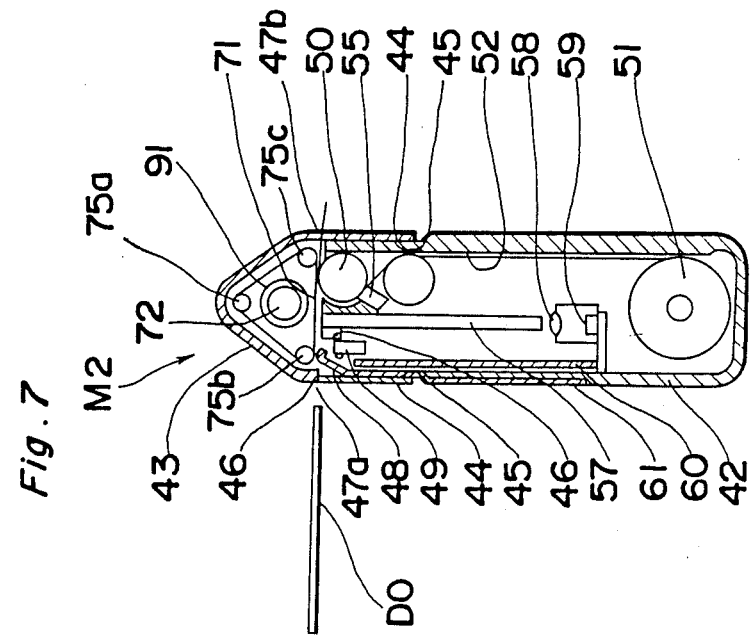

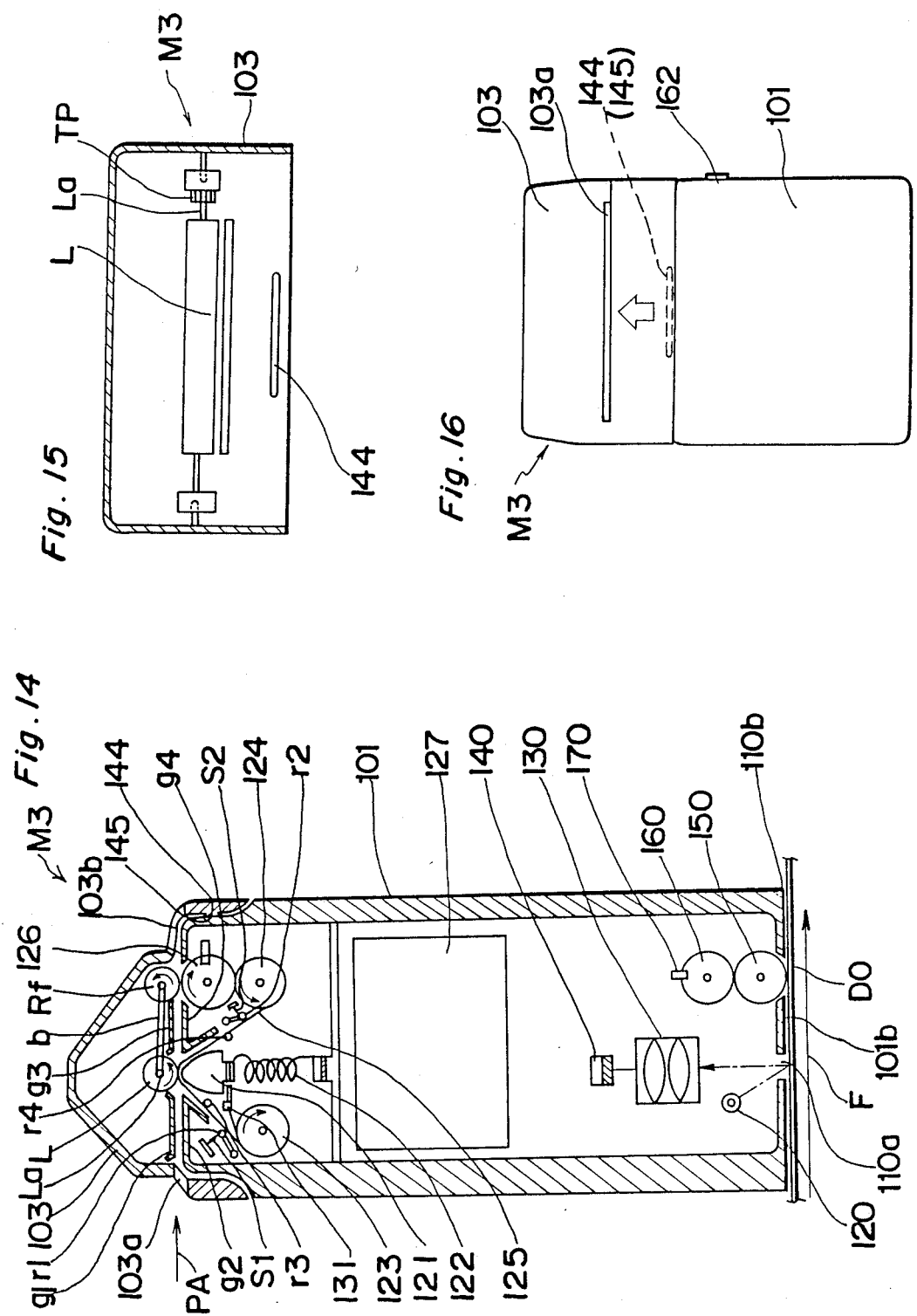

MANUAL COPYING APPARATUS

BACKGROUND OF THE INVENTION

The present invention generally relates to a copying apparatus and more particularly, to a compact manual copying apparatus of a handy or portable type arranged to manually scan the surface of an original document by an image reading means during an original document reading work, and also to manually scan the surface of a transfer material, e.g., a copy paper, by a printing means during a printing work.

Commonly, in a copying apparatus to be installed at a predetermined position, including a compact desk-top type copying apparatus or the like, transfer material is transported by a transport means such as a belt or rollers, and the minimum size of the transfer material or copy paper sheet to be transported, is limited to a size of a name card and the like, while for large members, such as an original document, platform, a photoreceptor, etc. are essentially required, since electrophotography is generally adopted as the copying apparatus. Accordingly, in the copying apparatuses of the installation type, there are limitations to the reduction in size of the transfer paper, compact size of the apparatus, and cost reduction in the manufacture of the copying apparatus.

In order to overcome the disadvantages as described above, there has conventionally been proposed a portable type manual copying apparatus which is so arranged that an image reading means and a printing means provided within the apparatus are subjected to manual scanning on the surfaces of an original document and a transfer material or copy paper sheet, whereby the copying operation may be readily effected through employment of a small-sized original document or transfer material which can not be independently transferred or copied by the installation type copying apparatus referred to earlier.

However, in the known manual copying apparatus of the above described type, there are none that have been arranged to maintain a constant contact pressure between the printing portion of the printing means and the transfer material. Therefore, the contact pressure between the printing portion and the transfer material is altered due to variation in the force to be applied to the apparatus during the manual scanning, resulting in the deterioration in the state of image formation due to non-uniformity in the image density. Meanwhile, in the case where an excessive force is accidentally applied to the apparatus, there is the possibility that the printing portion will be undesirably damaged.

Moreover, in the conventional manual copying apparatus as described above, since no platform is provided for holding the original document or copy paper, the copying apparatus main body must be subjected to the manual scanning by one hand, while the original document or copy paper is being held by the other hand. Therefore, in the case where an image is to be printed on transfer material of a particularly small size, it is difficult to move the copying apparatus for scanning in a correct direction with respect to the transfer material, thus also inviting deterioration in the state of image formation, such as inclination of the copied image, missing of part of the image, etc.

Furthermore, the known manual copying apparatus as described above is particularly poor in the scanning performance when the image is to be formed on a transfer material the width thereof in a direction perpendicular to the scanning direction being narrower than the width of the copying apparatus main body, and the copying apparatus can not be displaced in a proper direction, also resulting in a deterioration in the state of image formation as referred to above.

SUMMARY OF THE INVENTION

Accordingly, an essential object of the present invention is to provide a manual apparatus which is arranged to maintain a constant contact pressure between a printing portion thereof and a transfer material at all times during the printing work, so as to achieve a favorable state of image formation, and also to prevent any damage to a transfer portion of the copying apparatus.

Another important object of the present invention is to provide a manual copying apparatus of the above described type which is so arranged that the transfer material is adapted to be displaceable in a scanning direction with respect to a fixed printing portion, whereby even a transfer material of a size which can not be correctly held may be maintained in a proper scanning direction for achieving a favorable state of image formation.

A further object of the present invention is to provide a manual copying apparatus of the above described type which is so arranged that a transfer material, whose width in a direction perpendicular to a scanning direction is small, may be transported in such a scanning direction as it is held in contact with the printing portion, such that the printing operation can be readily and positively effected even when the image is to be formed on a transfer material of a small size so as to prevent deterioration in the state of image formation.

In accomplishing these and other objects, according to one preferred embodiment of the present invention, there is provided a manual copying apparatus including an image reading means for reading an image of an original document to be copied, and a printing means for printing the image read by the image reading means onto a transfer material, arranged so as to subject the printing means to manual scanning during the printing work, with its printing portion held in contact with the transfer material, characterized in that there is provided a resilient means adapted to support the printing means in a floating state so that the printing portion thereof contacts the transfer material under a constant pressure during the printing work.

By the above arrangement, according to the present invention, since the printing means having the printing portion can be supported in a floating state by the resilient means, the contact pressure between the transfer material and the printing portion may be maintained constant at all times irrespective of magnitudes of forces applied to the apparatus by an operator during the printing work. Therefore, a favorable state of image formation may be maintained at all times, without any deterioration thereof during the printing operation. Moreover, since the contact pressure between the printing portion and the transfer material does not exceed a predetermined level, even when an excessive force is accidentally applied by the operator, any damage to the printing portion can be advantageously prevented.

In another aspect of the present invention, there is provided a manual copying apparatus including an image reading means for reading an image of an original document to be copied, and a printing means for printing the image read by the image reading means onto a transfer material, arranged to subject the printing means to manual scanning during the printing work with its printing portion held in contact with the transfer material, characterized in that there is provided a transfer material transport means detachably mounted on the manual copying apparatus, and positioned to confront the printing means so as to move the transfer material in the scanning direction, with the transfer material being held in contact with the printing portion.

Owing to the above construction of the present invention for printing the image onto the transfer material of a small size, the transfer material transport means is mounted to confront the printing means, whereby the transfer material may be displaced in the scanning direction as it is held in contact with the printing portion. Accordingly, after leading the transfer material into the transfer material transport means by one hand, with the manual copying apparatus main body being held by the other hand, the image may be formed as it is correctly positioned in the scanning direction of the transfer material, without necessity for displacing either the copying apparatus or the transfer material. Therefore, there is no possibility that the image will be printed in an inclined state or in a state partly missing, and thus, the printing image can be maintained in a favorable state at all times.

In a further aspect of the present invention, the manual copying apparatus including an image reading means for reading an image of an original document to be copied, and a printing means for printing the image read by the image reading means onto a transfer material, arranged to subject the printing means to manual scanning during the printing work, with its printing portion held in contact with the transfer material, is characterized in that there is further provided a cover structure detachably mounted on the manual copying apparatus, and including a holding means for holding the transfer material in a roll form, and a transport means for moving the transfer material drawn out from the roll in the scanning direction, with the transfer material being held in contact with the printing portion.

By the construction of the present invention as described above, in the case where it is required to form an image on a small-sized transfer material, the cover structure is mounted onto the copying apparatus, and the transfer material led out from the transfer material roll included in the cover structure may be displaced in the scanning direction, while being held in contact with the printing portion. In this case, by moving the transfer material from the roll with respect to the copying apparatus main body, with the apparatus main body fixed by one hand, the image may be formed on the transfer material. Since the roll-formed transfer material is held by the cover structure, it is not displaced in the direction perpendicular to the apparatus main body, and is free from any inclination with respect to the apparatus main body, and consequently, the formed image may be maintained in a favorable state, without inclination or missing in any part, etc.

In still another aspect of the present invention, there is provided an image information processing apparatus which includes a main body in which an image reading sensor for optically reading image information, and a processing means for processing the image information thus read are accommodated, a protective cover member detachably mounted with respect to the main body so as to protect the image reading sensor when mounted, and also to form an original document inserting gap between the protective cover member and the main body, and a reading starting switch arranged to be actuated for starting reading of the original document, when the original document is inserted into the original document inserting gap, and also, when the image reading sensor is position at an original document reading position confronting the original document, with the protective cover member detached from the main body.

In the image information processing apparatus according to the present invention as described above, no switch operation is required for reading the image information. In other words, when an original document is placed at a position capable of reading the original document, the reading starting switch is actuated for automatically starting reading of the image information. Accordingly, operation work required for the user is reduced, while accuracy in reading may be improved. More specifically, in the case of a so-called handy copying or copying with the apparatus gripped by one hand, the required portion of the original document can be correctly scanned.

Furthermore, it is possible to read the image information by inserting a small-sized card, receipt or the like into the original document inserting gap, with the protective cover member attached to the apparatus main body, and, in such a case, since the original document inserting gap guides the original document, even a small-sized original document may be correctly read.

BRIEF DESCRIPTION OF THE DRAWINGS

These and other objects and features of the present invention will become apparent from the following description taken in conjunction with the preferred embodiments thereof with reference to the accompanying drawings, in which:

FIG. 3 is a fragmentary cross section for explaining functions of a printing means in the manual copying apparatus of FIG. 1

FIGS. 4(A) and 4(B) are side sectional views showing, on an enlarged scale, the general construction and function of a cover structure employed in the copying apparatus of FIG. 1;

FIG. 7 is a side sectional view showing a general construction of a handy type compact copying apparatus as an image information processing apparatus according to a second embodiment of the present invention;

FIG. 8 a fragmentary cross section showing an original document transport mechanism and a copy paper feeding mechanism employed in the copying apparatus of FIG. 7;

FIG. 9 is a front elevational view of the copying apparatus shown in FIG. 7;

FIG. 14 is a schematic side sectional view showing a general construction of a compact copying apparatus according to a third embodiment of the present invention;

FIG. 15 is a front sectional view of a protective cover member to be employed in the copying apparatus of FIG. 14; and FIG. 16 is elevational view of the copying apparatus of FIG. 4 applied with the protective cover member.

DETAILED DESCRIPTION OF THE INVENTION

Figure 2:
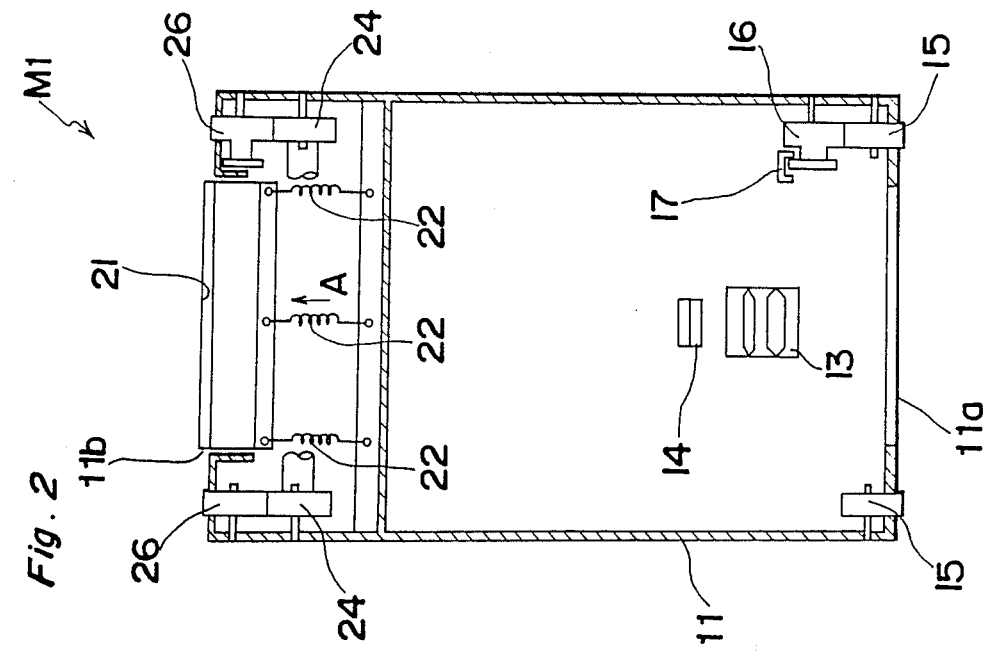
FIG. 2 is a schematic front sectional view of the manual copying apparatus of FIG. 1.

Before the description of the present invention proceeds, it is to be noted that like parts are designated by like reference numerals throughout the accompanying drawings.

Figure 1:
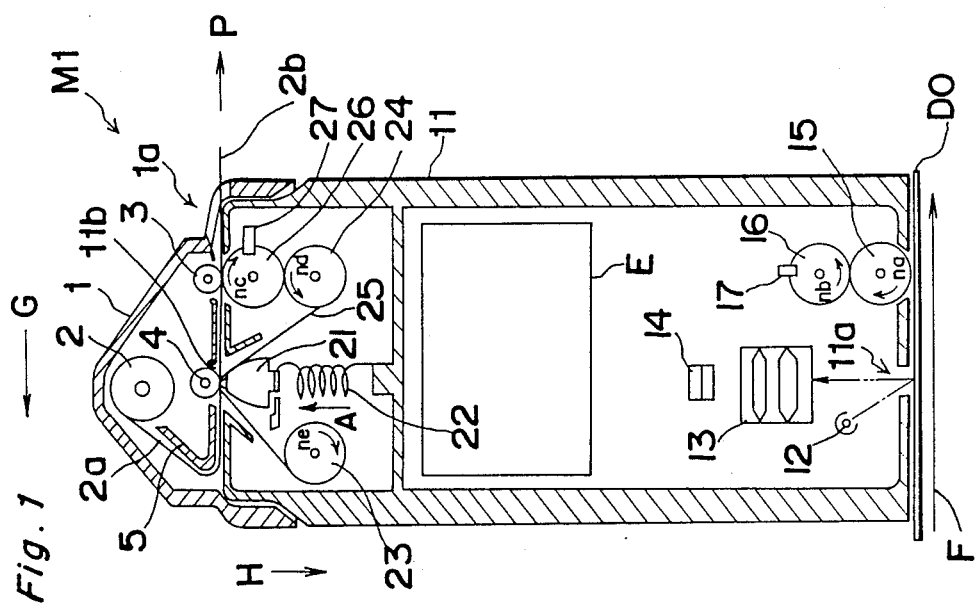
FIG. 1 is a schematic side sectional view showing a general construction of a manual copying apparatus according to one preferred embodiment of the present invention.

Referring now to the drawings, there is shown in FIGS. 1 and 2, a manual copying apparatus M1 according to one preferred embodiment of the present invention which generally includes a copying apparatus main body 11, and an image reading means and a printing means incorporated in the copying apparatus main body in a manner as described in detail hereinafter.

Within the manual copying apparatus main body 11, in the vicinity of its one end (i.e., lower end in FIGS. 1 and 2) in a longitudinal direction thereof, there are provided a light source 12, a lens 13, and a photosensor 14 disposed above the lens 13. The lens 13 is composed, for example, of an image transmitter in a bundled configuration, while the photosensor 14 is composed for example, of one-dimensional CCD sensor. During reading of the image, light from the light source 12 is projected outwardly through a slit 11a formed in a bottom wall of the apparatus main body 11, onto an original document DO, and the reflected light therefrom is led into the photosensor 14 through the lens 13. The image information thus read by the photosensor 14 is stored in a memory of a control section (not shown) as image data. In a position adjacent to the slit 11a, rollers 15 are rotatably provided so as to be partly exposed out of the bottom wall of the apparatus main body 11, while a driven roller 16, provided with a photointerrupter 17 as a speed sensor for detecting the rotational speed, is held in contact with one of the rollers 15, as shown.

The parts described so far constitute the image reading means, and during the image reading work, the copying apparatus main body 11 is displaced in a direction indicated by an arrow F (FIG. 1) over an original document DO, whereby the image of the original document DO is scanned by the light from the light source 12, and the light reflected therefrom is stored in the memory of the control section (not shown) in the form of the image data, as stated earlier. During the image reading, when the apparatus main body 11 is moved in the direction of the arrow F, the rollers 15 held in contact with the original document DO are rotated in a direction of an arrow na, whereby the driven roller 16 is rotated in a direction of an arrow nb. The photo-interrupter 17 reads the rotational speed of the driven roller 16 so as to input it into the control section as speed data. The control section (not shown) sets the region of memory for storing the image data based on the speed data inputted by the photo-interrupter 17.

On the other hand, in the vicinity of the other end portion of the copying apparatus main body 11, a thermal head 21 is supported by a spring means 22 (including three springs 22 in this embodiment in a floating state, with an ink ribbon 25, movably supported by reels 23 and 24, being directed over the thermal head 21. By the above construction, an elastic force in the direction of an arrow A is applied to the thermal head 21, and thus, part of the thermal head 21 is exposed out of the copying apparatus main body 11 through a slit or opening 11b together with part of the ink ribbon 25. The reel 24 is held in contact with rollers 26 provided with a photo-interrupter 27 as a speed detecting sensor and partly exposed out of the copying apparatus main body 11, and rotated following rotation of the rollers 26.

The printing means is constituted by the parts as described above, and for effecting the printing work, the copying apparatus main body 11 is manually displaced in a direction indicated by an arrow G on a transfer material T, as shown in FIG. 3. When the main body 11 is set so that the printing means side thereof contacts the transfer material T, the thermal head 21 supported by the springs 22 in the state of floating is displaced in a direction of an arrow H by the contact thereof with the transfer material T until the forward end thereof generally becomes flush with the surface 11c of the copying apparatus main body 11. By the above function, the elastic force in the direction of the arrow A is produced so as to bring the thermal head 21 into contact with the transfer material T under a constant pressure through the ink ribbon 25. When the main body 11 is displaced in the direction of the arrow G, the rollers 26 are rotated in the direction of an arrow nc through contact thereof with the transfer material T, and the reel 24 following the rotation is rotated in the direction of an arrow nd. Accordingly, the ink ribbon 25 is moved from the reel 23 onto the reel 24, and thus, as the main body 11 is displaced in the direction of the arrow G, a fresh portion of the ink ribbon 25 comes into contact with the transfer material T.

The photo-interruptor 27 detects the rotational speed of the rollers 26, and the result of rotation is applied to the control section (not shown) as the speed data. The control section reads out the image data from the memory according to the speed data thus applied so as to drive the thermal head 21, whereby the ink of the ink ribbon 25 is thermally transferred onto the transfer material T in the position corresponding to the image of the original document. More specifically, when the thermal head 21 moves in the direction of the arrow H, a switch (not shown) detects this movement, and the image data is read out from the control section. The thermal head 21 is driven according to the above image data, and the image is transferred onto the transfer material or copy paper T. The speed of displacement of the copying apparatus main body 11 in the direction of the arrow G is detected by the photo-interruptor, i.e., speed sensor 27. Since the speed for reading out the image data is determined based on the result of the above detection, it is possible to accurately reproduce the image of the original document for printing, irrespective of the speed of displacement in the direction of the arrow G.

In the above printing work, the displacement of the thermal head 21 in the direction of the arrow H is limited up to the position where the forward end of the thermal head becomes generally flush with the bottom face 11c of the main body 11, and thus, variation in the effective length of the springs 22 is also constant at all times. Accordingly, the elastic force in the direction of the arrow A acting from the springs 22 to the thermal head 21 is of the same magnitude at all times, and thus, the contact force between the thermal head 21 and the transfer paper T can also be maintained at a constant degree of pressure. Moreover, eve in the case where a force applied by the operator should become excessive during displacement of the copying apparatus main body 11 in the direction of the arrow G, such a force is not exerted upon the thermal head 21, which is thus free from any damage. It is to be noted here that a battery or cell E (FIG. 1) provided generally at a central portion of the main body 11 is adapted to supply power to the light source 12, thermal head 21 and microprocessor constituting the control section, etc. described earlier.

Still referring to FIG. 1, a cover structure 1 is detachably mounted on the outer end face at the side of the printing means of the copying apparatus main body 11. Within this cover structure 1, there are provided a transport roller 3, a platen 4 and a paper guide 5. (FIGS. 4(A) and 4(B).) The roller 3 is rotatably disposed in a position confronting the roller 26 within the copying apparatus main body 11, while the platen 4 is provided in a position confronting the thermal head 21 when the cover structure 1 is attached to the main body 11. Furthermore, in a position above the platen 4, a roll 2 of the transfer material or copy paper 2a is rotatably supported. The transfer material 2a paid out from the roll 2 is led in contact with the outer side of the paper guide 5, and is directed outside the cover structure 1 through an opening or slit 1a via the platen 4 and roller 3.

In the above construction, the roll 2 of the transfer material is the roll-formed transfer material and the roller 3 is equivalent to the transport means according to the present invention.

FIGS. 4(A) and 4(B) are cross sectional views of the cover structure shown on an enlarged scale for explaining detailed constructions and functions thereof.

In the inner surface of the cover structure 1, a rotary shaft 3a for the transport roller 3 is rotatably supported so as to be extended through one end of a support member 6, whereby said support member 6 is pivotally mounted with respect to the cover structure 1. The support member 6 also rotatably supports the platen 4, and is formed at its other end with the paper guide 5 referred to earlier, and is further formed in the vicinity of its central portion with bearing portions 6a. As is seen from FIG. 4(B), each of the bearings 6a is formed at its distal end portion with a semi-circular stepped portion or notch in which a shaft 2c of the paper roll 2 is fitted. Moreover, on the inner surface of the cover structure 1 in position corresponding to the shaft 2c, there are fixed bearings 7 which are formed by a resilient resin material so as to be deformed to a certain extent by the action of an external stress. Each of the bearings 7 has a fitting portion 7a partly open outside. By the above construction, as the support member 6 is moved in the direction of an arrow K from the state as shown in FIG. 4(B), the shaft 2c of the paper roll 2 is fitted into the portions 7a of the bearings 7. In this case, the lower end of each bearing 7 is expanded outwardly by the depressing force in the direction of an arrow i by the shaft 2c, and when the shaft 2c has been fitted into the fitting portions 7a, the lower end of the bearing 7 is restored back to the original state by its resiliency, thereby to hold the shaft 2c positively, and thus, the support member 6 is also stopped at the state, as shown in FIG. 4(A).

In order to form the image on the transfer paper 2a of the paper roll 2 through employment of the cover structure 1 having the construction as described above, the cover structure 1 is mounted at the side of the printing means of the copying apparatus main body 11 as shown in FIG. 1 after exposing outside the end portion 2b of the transfer paper 2a through the opening 1a.

By the attachment of the cover structure 1 as described so far, the thermal head 21 as depressed by the platen 4 is displaced in the direction of the arrow H, and driving data is applied to the thermal head 21 from the control section. In the above state, when the end portion 2b of the transfer paper 2a is drawn out in the direction of an arrow P, the roller 26 depressed by the transport roller 3 is rotated in the direction of the arrow nc. The photo-interruptor 27 detects rotation of the roller 26, and the result of the detection is applied to the control section as the speed data. The control section reads out the image data from the memory based on the above speed data so as to drive the thermal head 21. Meanwhile, the reel 24 rotates in the direction of an arrow nd following rotation of the roller 26 in the direction of the arrow nc. Accordingly, the ink ribbon 25 is wound onto the reel 24 from the reel 23, and thus, the portion of the ink ribbon 25 contacting the transfer paper 2a of the paper roll 2 is renewed at all times as the transfer paper 2a is displaced in the direction of the arrow P (FIG. 1). In the case where the end portion 2b of the transfer paper 2a is to be pulled out in the direction of the arrow P since the transfer paper 2a is held in contact with the paper guide 5 over its entire width in the direction perpendicular to the direction of the arrow P, there is no possibility that the direction of displacement of the transfer paper 2a be inclined toward the direction perpendicular to the direction of the arrow P, thus maintaining a favorable state of image formation. Moreover, the transfer paper 2a, can be pulled out by one hand, with the copying apparatus main body 11 being grasped by the other hand for efficient operation.

Figure 5:
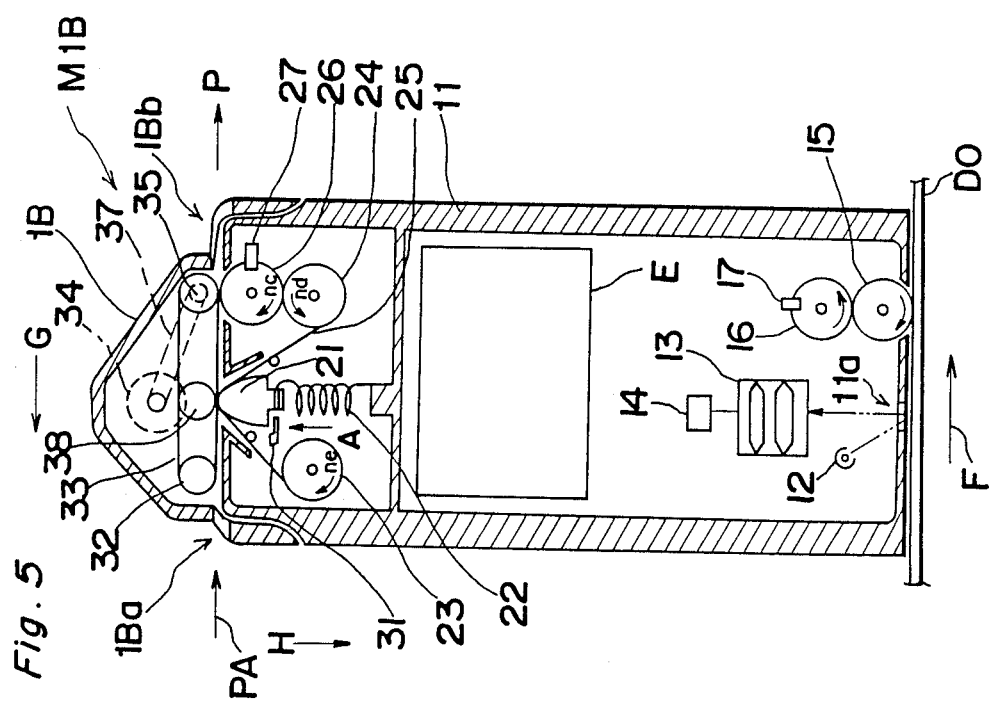
FIG 5 is a view similar to FIG. 1, which particularly shows a modification thereof.

Referring to FIG. 5, there is shown a modification of the manual copying apparatus of FIG. 1, with like parts in FIG. 1 being designated by like reference numerals for brevity of description.

In the modified copying apparatus MIB of FIG. 5, during the printing, the copying apparatus main body 11 is manually moved in the direction of the arrow G, with the rollers 26 held in contact with the transfer paper (not shown) generally in a similar manner as in the copying apparatus of FIG. 1. In this case, part of the ink ribbon 25 and that of the thermal head 21 exposed outside are moved in the direction of the arrow H owing to the contact thereof with the transfer paper. When the thermal head 21 is brought into contact with a switch 31 provided thereunder by the above movement, control data for the thermal head 21 corresponding to the image data is outputted from the control section. Thus, portions of the thermal head 21 corresponding to the control data are heated, and the ink of the ink ribbon 25 is thermally transferred onto the transfer paper. Upon further displacement of the copying apparatus main body 11 in the direction of the arrow G, the rollers 26 are rotated in the direction of the arrow nc through contact thereof with the transfer paper, and the above rotation is transmitted to the reel 24, which is rotated in the direction of the arrow nd. By the above function, the ink ribbon 25 is taken up from the reel 23 onto the reel 24. Therefore, a fresh portion of the ink ribbon 25 is adapted to contact the transfer paper at all times. Meanwhile, the number of revolutions of the rollers 26 is detected by the photo-interrupter 27. The revolution data as detected by the photo-interrupter 27 is applied to the control section so as to calculate the moving speed in the direction of the arrow G. The control section outputs the image data stored in the memory as the control data according to the moving speed obtained by the calculation.

In the copying apparatus MIB of FIG. 5, the light source 12, lens 13, photosensor 14, rollers 15 and 16 and photo-interrupter 17 constitute the image reading means, while the thermal head 21 forms the printing portion, and the reels 23 and 24, and roller 26, ink ribbon 25 and switch 31, including the above thermal head 21, constitute the printing means in the similar manner as in the copying apparatus of FIG. 1.

Figure 6:
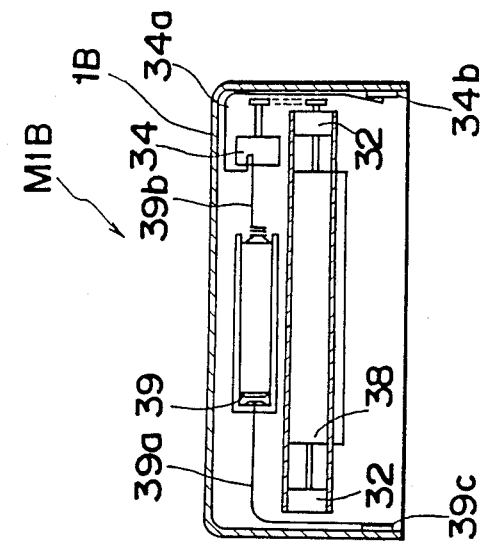
FIG. 6 is a front sectional view showing a transfer material transport means to be mounted on the modified copying apparatus of FIG. 5.

Referring also to FIG. 6, on the outer side face at the side of the printing means of the copying apparatus main body 11, a transport unit structure 1B is detachably mounted. In the interior of this structure 1B, a transport belt 33 in an endless form is movably directed around the transport rollers 32 and 35. At a position within the inner periphery of the belt 33 confronting the thermal head 21, a platen 38 is provided. The transport roller 35 is transmitted with rotation of a motor 34 through a belt 37. To the motor 34, a lead wire 34$a$ connected to a terminal 34$b$ and another lead wire 39$b$ connected to one pole of a battery 39, are connected. With the other pole of the battery 39, a lead wire 39$a$ connected to a terminal 39$c$ is held in contact. The terminals 39$c$ and 34$b$ are respectively held in contact with terminals (not shown) provided on the copying apparatus main body 11. By the above connections, upon the turning on of a switch (not shown) of the copying apparatus main body 11, power is supplied to the motor 34 from the battery 39 to rotate the motor for driving the transport rollers 35.

The transport unit structure 1B has an inlet opening 1B$a$ formed at a position confronting a passage between the transport belt 33 and the thermal head 21, i.e., at the left side of the structure 1B in FIG. 5 and an outlet opening 1B$b$ formed in a position adjacent to the roller 35 at the right side. When the switch at the copying apparatus main body 11 is turned on, and the transfer paper is inserted through the opening 1B$a$ in the direction indicated by an arrow PA, with the transport roller 35 being driven, the transfer paper is led toward the thermal head 21 by the contact thereof with the transport belt 33. In the above case, the ink ribbon 25 and transfer paper are present between the thermal head 21 and the platen 38, and the thermal head 21 is displaced in the direction of the arrow H, whereby the switch 31 is turned on, and the control data corresponding to the image data is outputted from the control section so as to transfer the ink of the ink ribbon 25 onto the transfer paper. The rollers 26 are rotating in the direction of the arrow nc by the contact thereof with the transport belt 33 prior to the insertion of the transfer paper, and therefore, at the time point when the transfer paper is to be inserted, the ink ribbon 25 is being wound onto the reel 24 at a constant speed.

Thus, in the case where the transfer paper has such a size that its width in the direction perpendicular to the image forming direction is smaller than the width of the copying apparatus main body 11, it is possible to guide the transfer paper by the transport belt 33 into a position confronting the thermal head 21 and the ink ribbon 25.

Since the transport belt 33 is driven at a constant speed, there is no possibility that the transfer paper is adversely affected by its moving speed. Moreover, since the opening 1B$a$ is formed at a position corresponding to the transport belt 33, the transfer paper may be guided to a correct position with respect to the thermal head 21, without any inclination or partial missing of the image, etc.

Referring further to FIGS. 7 to 13, there is shown in FIG. 7, a copying apparatus M2 according to a second embodiment of the present invention.

In FIG. 7, the copying apparatus M2 generally includes a copying apparatus main body 42, and a protective cover member 43 which is detachably mounted on the main body 42 and positioned thereon through engagement of an engaging protrusion 45 of the cover member 43 with a corresponding engaging recess 44 formed in the copying apparatus main body 42.

Between the copying apparatus main body 42 and the protective cover member 43, there is formed an original document inserting gap 46 for inserting an original document DO therethrough, with the gap 46 being communicated with an inlet slit 47$a$ and an outlet slit 47$b$ provided in the protective cover member 43.

At the side of the copying apparatus main body 42, there are provided a switch lever 48 and the power switch 49 in positions facing the portion of the original document inserting gap 46 adjacent to the inlet slit 47$a$. When the original document DO is inserted through the inlet slit 47 so as to depress the switch lever 48 thereby, the power switch 49 is actuated.

Moreover, at the copying apparatus main body side, in a position confronting the portion of the inserting gap 46 close to the outlet slit 47$b$, there is rotatably provided a copy paper feeding roller 50. By winding the copy paper 52 drawn out from a paper roll 51 onto the copy paper feeding roller 50, and rotating the roller 50 by a motor 54 through a gear 53 shown in FIG. 8, the copy paper feeding may be effected.

In the vicinity of the copy paper feeding roller 50, there is provided a printer head 55.

In the copying apparatus main body 42, in positions confronting the portion of the original document inserting gap 46 between the switch lever 48 and the roller 50, a light emitting portion 56 and a light path member 57 are provided as shown. Light emitted from the light emitting portion 56 and reflected by the original document DO is led into a lens 58 by the light path member 57 so as to be incident upon a photosensing portion 59, which is, for example, a CCD unit which optically reads the image information of the original document DO.

The copying apparatus main body 42 is further provided with a circuit board 60 on which the co circuit is mounted, while, at the front wall of the main body 42, an LCD panel 61 is provided for display as shown in FIG. 9. The copying apparatus main body 42 is further provided on its side wall with a function switch 62, which effects data alterations, etc. as described later.

With the protective cover member 43, in a position facing an original document inserting passage 46, there is provided an original document transport belt 71 which is movably supported by rollers 75$a$, 75$b$ and 75$c$. When a motor 73 is rotated by a battery 72 incorporated in a battery case 91 in the cover member 43 as a power source so as to drive the roller 75$a$ through a gear 74, the original document transport belt 71 is rotated, and the original document DO in contact therewith is displaced in the direction of insertion.

For effecting copying from a large-sized original document through employment of a small-sized copying apparatus as described above, the protective cover member 43 mounted on the copying apparatus main body 42 is detached therefrom, and after winding the end of the copy paper 52 drawn out from the paper roll 51 onto the roller 50 provided adjacent to the slit 47b of the main body 42 to a certain extent, the roller 50 is depressed onto the original document through the copy paper 52.

By the above procedure, light emitted from the light emitting portion 56 and reflected by the original document is incident upon the photosensing portion 59 from the lens 58 through the light path member 57. The photosensing portion 59 is constituted, for example, by an image sensor or the like, and the printer head 55 is actuated according to the image signal applied to the photosensing portion 59.

Accordingly, with the roller 50 being pressed against the original document DO through the copy paper 52 as described above, the operator depresses the copy switch 62 provided at the side of the copying apparatus main body 42 (FIG. 9), and simultaneously, displaces the main body 42 along the original document.

Based on the signal from the copy switch 62, the printer head 55 is actuated according to the image information applied to the photosensing portion 59, and by displacing the copying apparatus main body 42 along the original document, the roller 50 is rotated through the copy paper 52 which is drawn out from the paper roll 51, and thus, the image corresponding to the image of the original document is transferred onto the transfer paper 52 by the printer head 55.

Since it is very difficult to scan an original document of a small size, etc., by the conventional practice to displace the copying apparatus main body 42 while sliding it over the original document, with the main body 42 being held by hand, it is so arranged in this embodiment that the original document transport path (from the inlet slit 47a to the outlet slit 47b) is formed between the protective cover member 43 and the copying apparatus main body 42 upon attachment of the cover member 43 onto the main body 42, while the transport belt 71, as one example of a paper feeding means for transporting the small-sized original document together with the copy paper 52, and the driving means of the belt 71, are incorporated within the protective cover member 43.

More specifically, within the protective cover member 43, the motor 73 is incorporated, and by engaging the gear 74 mounted on the output shaft of the motor 73 with a gear 92, and further engaging the gear 92 with a gear (not shown), etc. provided on the roller 75a, the rotation of the motor 73 is transmitted to the roller 75a through speed reduction.

The motor 73 referred to above is connected to the battery 72, and it is so arranged that upon attachment of the protective cover member 43 onto the copying apparatus main body 42, terminals 93 and 94 provided at the inner side of the opening for the cover member 43 are conducted through a switch (not shown) controlled by the copy switch 62 and the control circuit board 60 provided at the side of the copying apparatus main body 42. The battery 72 is inserted in the battery case 91 provided within the protective cover member 43.

In the protective cover member 43, the inlet slit 47a and outlet slit 47b (FIGS. 7 and 9) for inserting and discharging the original document are formed as described earlier, and the roller 75c is provided ad a to the outlet slit 47b in the passage leading to the slit. One roller 75a of the rollers 75a and 75b which are provided in parallel with the roller 75c, is provided at the uppermost portion of the cover member 43, while the other roller 75b is provided adjacent to the inlet slit 47a, with the endless belt 71 being directed around the rollers 75a, 75b and 75c.

As also referred to earlier, in the copying apparatus main body 42, in a position confronting the roller 75b disposed at the side of the inlet slit 47a, the switch lever 48 is provided, and when the original document is inserted into the protective cover member 43 or the copying apparatus main body 42 is pressed against the original document, this switch lever 48 is actuated to turn on the power switch 49 associated therewith for making it possible to start the reading of the original document.

Figure 10:
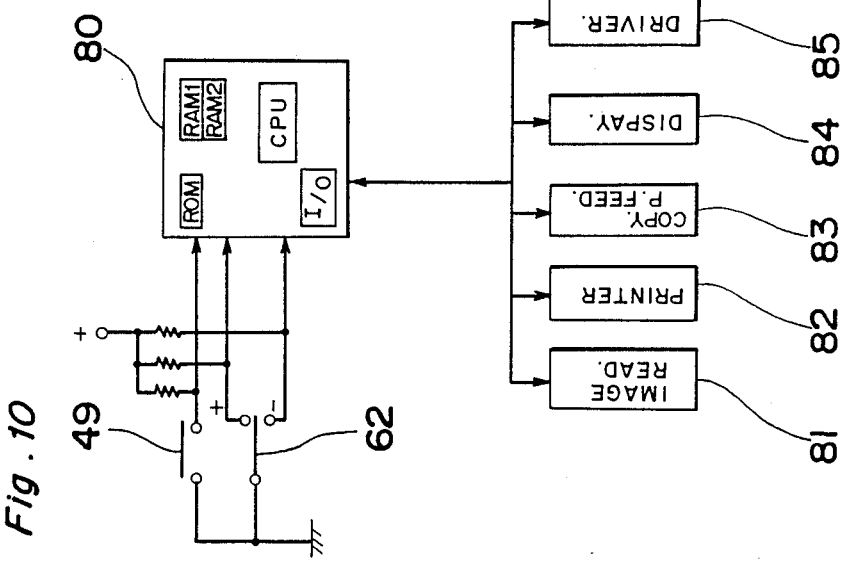
FIG. 10 is a block diagram showing a control system for the compact copying apparatus of FIG. 7.
Figure 13:
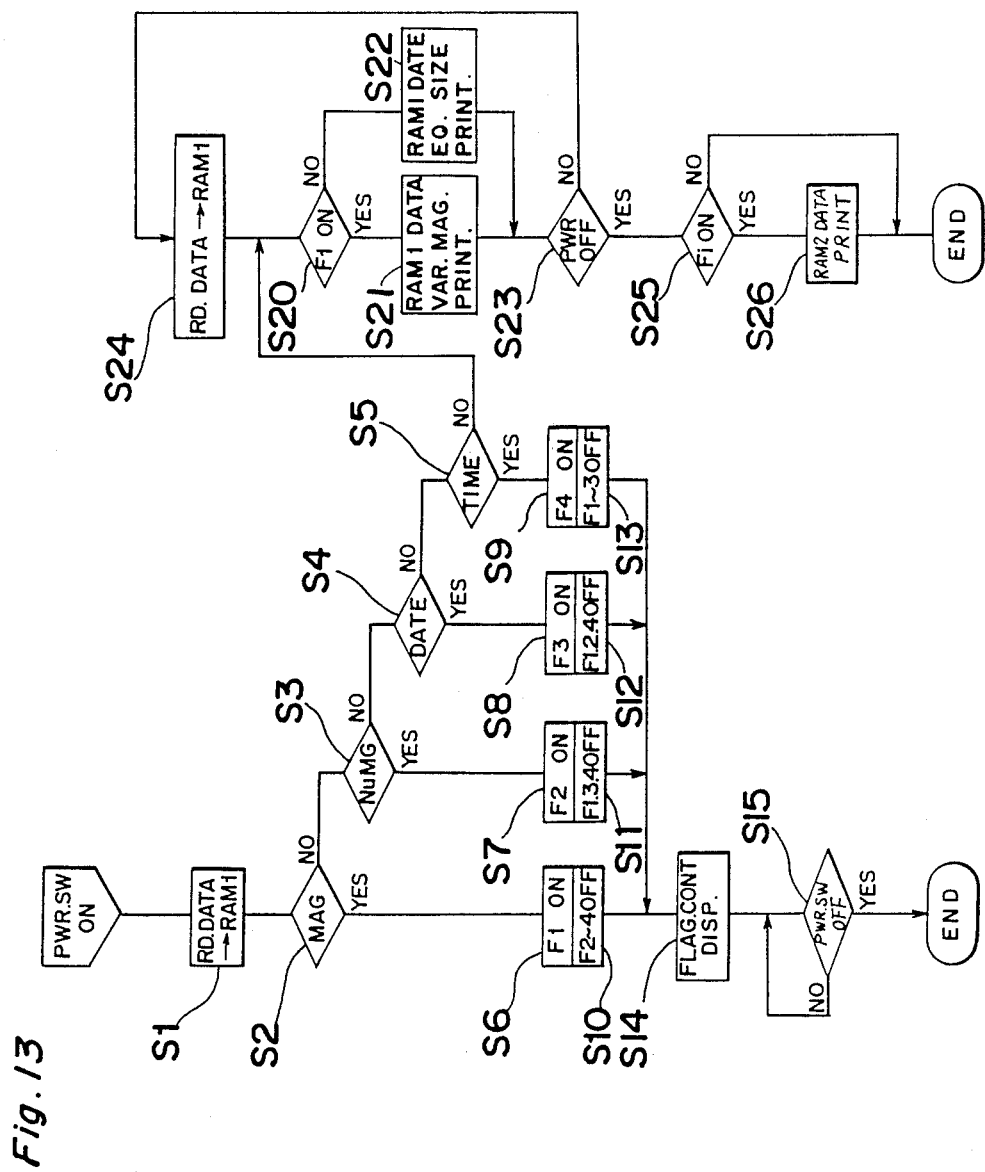
FIG. 13 a flow-chart showing functions at main portions of the of the compact copying apparatus of FIG. 7.

Referring also to FIG. 10, there is shown a block diagram representing a control system for the small-sized copying apparatus 41 described so far. In the control system of FIG. 10, a micro-processor system 80 includes a central processing unit CPU, a read only memory ROM, a random access memory RAM1, another random access memory RAM2, and an interface I/O senses the functioning of the power switch 49 and function switch 62 connected thereto, and controls the functions of the image reading section 81 having the light emitting portion 56 and photosensing portion 59, the printer section 82 having the printer head 55, the copy paper feeding section 83 having the copy paper feeding motor 54, the display section 84 including the liquid crystal panel 61, and a driver section 85 for controlling the original document transport section 86. The original document transport section 86 is located in the protective cover member 43, while the others are provided in the copying apparatus main body 42.

Figure 11:
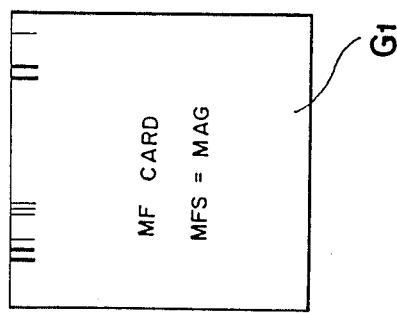
FIGS. 11 and 12 are top plan views showing examples of multi-function cards to be read by the copying apparatus of FIG. 7.
Figure 12:
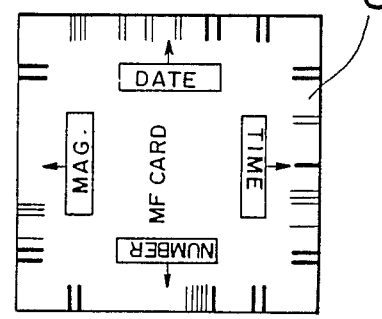

In the copying apparatus 41 as described above, under the state where the protective cover member 43 is applied onto the main body 42, it is possible to read an original document of a size which can be inserted into the inlet slit 47a for copying, but if a multi-function card G1 or G2 as shown in FIG. 11 or 12 is arranged to be read, other functions may be effected besides the mere copying function. As shown in FIGS. 11 and 12, these multi-function cards G1 and G2 have bar codes marked at side edges thereof.

In the compact carrying apparatus 41 as described above, many operating switches can not be provided due to limitation in space, and thus, a problem is faced as to how to effect the change-over of the functions efficiently. However, since the copying apparatus is inherently provided with the image reading section 81 for reading the image information, predetermined codes may be read through utilization thereof, thus effecting change over of a variety of functions.

By the above arrangement, it becomes unnecessary to provide many operating switches, with consequent reduction of operational errors at the same time.

Subsequently, functions of the compact copying apparatus 41 of FIG. 7 will be sequentially described.

In the case of a large-sized original document, the protective cover member 43 is detached from the main body 42, and, with the roller 50 being directly pressed against the original document through the copy paper 52 drawn out from the portion of the roller 50, the copying apparatus main body 42 is displaced for effecting scanning of the original document and feeding out of the copy paper, while for a small-sized original document, the copying apparatus is used, with the protective cover member 43 attached to the copying apparatus main body 42, as shown in FIGS. 7 and 9. In the above case, the engaging protrusion 45 provided at the inner lower portion of the cover member 42 is fitted into the engaging groove or recess 44 formed in the main body 42 to prevent the cover member 42 from disengagement, and the switch lever 48 is actuated to turn on the switch 49.

In the above state, the operator holds the copying apparatus main body 42 in his hand, and depresses the copy switch 62 provided at the side face thereof, whereby it is made possible to start the copying, with AND signals of the switch 62 and switch 49 being transmitted to the control circuit board 60. Thus, the driving instruction is emitted from the control circuit board 60, and the motor 73 is rotated by the current from the battery 72. The rotational force of the motor 73 is transmitted to the roller 75a through the gears 74 and 92, etc., thereby to cause the belt 71 passed around the rollers 75a, 75b and 75c to move. As is seen from FIG. 7, the belt 71 is held in contact also with the roller 50, and therefore, the roller 50 is rotated through movement of the belt 71 so as to draw the copy paper 52 out of the paper roll 51 for discharging through the outlet slit 47b. Simultaneously, since the original document DO inserted into the inlet slit 47a is also held in contact with the belt 71, the original document DO is transported along the belt 71, and thus, the exposure by the light emitting portion 56 and the scanning are started. The image of the original document obtained by the light from the light emitting portion 56 is projected onto the photosensing portion 59 through the lens 58 and the printer head 55 is caused to function according to the signal information corresponding to the image of the original document, whereby the image of the original document is formed onto the copy paper 52.

Therefore, the original document DO, upon insertion of its leading edge into the portion of the switch lever 48, is subsequently transported towards the outlet slit 47b automatically by the belt 71, and the original document finished for copy processing is discharged through the outlet slit 47b together with the copy paper 52.

By way of example, description will be given with reference to the case where the multi-function card G1 (FIG. 11) is read by the copying apparatus 41, with the protective cover member 43 being applied onto the main body 42. It is to be noted here that this multi-function card G1 is intended to effect the copying at variable magnifications.

In the state as shown in FIG. 7, upon insertion of the multi-function card G1 through the inlet slit 47a, the end of the card G1 depresses the switch lever 48, and thus, the power switch 49 is actuated. When the power switch 49 is actuated, the central processing unit CPU (FIG. 10) actuates the driver section 85 to drive the original document transport section 86 for movement of the original document transport belt 71, whereby the multi-function card G1 inserted into the inlet slit 47a at its end portion is automatically transported into the original document inserting gap 46 so as to be finally discharged from the outlet slit 47b.

Meanwhile, the central processing unit CPU also actuates the image reading section 81 to automatically start the reading of the multi-function card G1, and stores the data thereof in the random access memory, RAM1. This function is represented by step S1 in the flow-chart of FIG. 13.

The reading of the image information is carried out by repeating, at a predetermined time interval, the linear scanning in a direction at right angles with the direction of transportation of the original document, and when the scanning has reached the predetermined number, analysis of the read data is effected.

More specifically, it is checked whether the read data is of the data for instructing copying at variable magnifications (step S2), or of the data for designating the numbering (step S3), or of the data for setting date (step S4), or of the data for setting time (step S5).

Thus, corresponding flags of flags F1 to F4 are turned on, with other flags turned off (steps S6 to S13).

When the multi-function card G1 is inserted, the bar code at the edge thereof is read at step S2, and the flag F1 is turned on (step S6), with other flags F2 to F4 turned off (step S10).

Upon setting of either one of the flags F1 to F4, the function switch 62 becomes a switch corresponding to the function of the flag turned on.

For example, when the flag F1 is turned on, the function switch 62 acts as a magnification setting switch, and the copying magnification may be altered by depressing the function switch 62. Since the altered magnification is displayed on the LCD panel 61, copying may be effected at the magnification as desired. Meanwhile, if the flag F2 is turned on, the switch 62 functions as a switch for the numbering, with the number of sheets to be displayed on the LCD panel 61 being altered as the function switch 62 is depressed, and therefore, copying may be effected by the number as required.

Similarly, the switch 62 acts as a date changing switch by the flag F3, and also, as a time changing switch by the flag F4.

Subsequently, the central processing unit CPU displays the content of the function of the flag turned on and the corresponding internal data on the display section 84 (step S14). In the case of the multi-function card G1, the varied magnification is displayed. By the above step the user can check whether or not the reading is correct and the internal data is proper.

After completion of reading the code of the multi-function card G1, the original document transport belt 71 is driven until the card G1 is almost fed out of the outlet slit 47b, and when the trailing edge of the card G1 has passed therethrough and the switch lever 48 has been restored (step S15), the driver section 85 is turned off.

After the multi-function card G1 has been read, the original document DO to be copied is inserted through the inlet slit 47a, whereby the read data of the original document is stored in the random access memory or RAM1 in the similar manner as described earlier, and it is checked whether or not the content thereof designates any function.

Since the original document is neither a multifunction card nor is it provided with a bar code for designating any of the functions, the procedure is shifted from step S5 to step S20.

At step S20, it is checked whether or not the flag F1 is on. If the flag F1 is on, it means that the magnification has been designated, and therefore, copying corresponding to the magnification is carried out (step S21). More specifically, the copy paper is fed out by controlling the feeding speed of the copy paper feeding section 83 to be in agreement with the designated magnification, while the data stored in the random access memory RAM1 is thinned out or increased so as to achieve the designated magnification for printing at the printer section 82.

On the other hand, if the flag F1 is not on, it is not related to the copying at varied magnification, and therefore, copying at equal size or life size magnification is effected (step S22).

Subsequently, it is checked whether the power switch 49 is turned on or off (step S23), and also whether or not the original document has been scanned over its entire surface.

If the scanning of the original document has not been completed, the power switch 49 is in the "on" state, and the following portion is read so as to be stored in the random access memory RAM1 (step S24), thereby to carry out the copying in the similar manner, as above.

Upon completion of copying over the entire surface of the original document, the power switch 49 is turned off, and it is checked whether or not any of the other flags F2 to F4 is in the "on" state (step S25).

If any of the flags F2 to F4 is on, data corresponding thereto is formed in the random access memory RAM2 for printing the data thereof (step S26). Thus, the numbering, date, or time is printed.

When the printing of the numbering, etc. is completed or when neither of the flags F2 to F4 is turned on, the original document image reading section 81 is suspended in its function for termination of the operation.

The functioning of the copying apparatus 41, when the copying is effected with the protective cove member 43 being detached from the main body 42, is described hereinafter.

Upon detachment of the protective cover member 43, the copying apparatus main body 42 detects the detachment and sets the copy paper feed roller 50 to be free, with the function being changed over to the ordinary copying. Therefore, by moving the main body 42 by one hand, with one edge of the copy paper and the original document being depressed by the other hand, the ordinary copying may be effected in the similar manner as in the conventional practice.

In the above case, when the reading portion of the main body 42 is applied to a desired portion of the original document, the switch lever 48 is depressed by the original document to turn on the power switch 49 for automatic starting of reading. Therefore, not only the operation is simplified, but the desired portion of the original document can be copied more accurately.

In the multi-function card G2 as shown in FIG. 12, since bar codes with different functions, e.g., for the magnification, numbering, date and time are provided at the four side edges of the card G2 by inserting the card G2 into the inlet slit 47a, with the side edge written wit the desired bar code being directed forward, the required function of the magnification, numbering, date and time can be readily selected.

As is seen from the foregoing description, the compact copying apparatus of the present embodiment has no copy switch, and is so arranged that the reading function is automatically actuated if the original document is placed at a position where it can be read, and therefore, the operation is simplified, while the reading may be effected more correctly to that extent.

Moreover, since the original document inserting gap 46 acts as a guide for the original document, even an original document of a small size may be read correctly.

In short, according to the present embodiment, the image information processing apparatus is characterized in that there are provided the main body in which the image reading sensor for optically reading an image information, and a processing means for processing the image information thus read are accommodated, the protective cover member detachably mounted with respect to the main body so as to protect the image reading sensor when mounted, and also to form the original document inserting gap between the protective cover member and the main body, and the reading starting switch arranged to be actuated for starting reading of the original document, when the original document is inserted into the original document inserting gap, and also when the image reading sensor is positioned at an original document reading position confronting the original document, with the protective cove member detached. By the above construction, since the reading of the image information is automatically effected by placing the original document at the predetermined position capable of reading, the operating procedures are reduced to that extent, and thus, the reading of the image information may be effected more accurately.

Referring further to FIGS. 14 to 16, there is shown a copying apparatus M3 according to a third embodiment of the present invention.

In FIG. 14, the copying apparatus includes a copying apparatus main body 101, and a printer head 121 of a thermal type provided at one end portion (i.e., upper side in FIG. 14) of the main body 101, with a protective cover member 103 being detachably applied onto the end portion of the main body 101 so as to cover the printer head 121. The above protective cover member 103 is formed with a sheet inserting inlet 103a for inserting the transfer sheet thereinto and a sheet discharging outlet 103b for discharging the inserted sheet. An ink ribbon 125 paid out from a pay-out reel 123 and wound onto a take-up reel 124 is held in contact with the printer head 121.

The printer head 121 is normally urged in the direction of the protective cover member 103 as attached by a spring means 122.

Within the protective cover member 103, there is provided a platen roller L (a sheet feeding means) to which the printer head 121 is depressed through the ink ribbon 125 in a state where the protective cover member 103 is attached on the main body 101. This platen roller L is driven for rotation at a constant speed by a motor (not shown) provided within the protective cover member 103. As shown in FIG. 15, a toothed pulley TP is mounted on a central shaft La of the platen roller L, and through a belt b (FIG. 14) passed around the pulley TP, rotation of the platen roller L is transmitted to a feed-out roller Rf provided at the side of the sheet discharge outlet 103b. The directions of rotation of the above platen roller L and the feed-out roller Rf are shown by arrows in FIG. 14.

The feed-out roller Rf as described above is brought into contact with an intermediate roller 126 provided at the side of the copying apparatus main body 101 by mounting the protective cover member 103 onto the main body 101. Since the above intermediate roller 126 is held in contact with the take-up reel 124 of the ink ribbon 125, when the platen roller L is rotated by the motor (not shown), the rotation thereof is transmitted to the take-up reel 124 through the feed-out roller Rf and the intermediate roller 126.

In a position generally halfway between the sheet inserting inlet 103a and the sheet discharging outlet 103b, there is provided a contact portion of the platen roller L with respect to the printer head 121, and a set of spaced guide plates g1 and g2 are provided to extend from the sheet inserting inlet 103a toward the contact portion between the platen L and the printer head 121, while another set of spaced guide plates g3 and g4 are provided from said contact portion toward the sheet discharging outlet 103b. The contact portion between the feed-out roller Rf and the intermediate roller 126 is located on a straight path extending from the guide plates g3 and g4 toward the outlet 103b.

Accordingly, a linear sheet transport passage is to be formed by the sheet inserting inlet 103a, guide plates g1 and g2, guide plates g3 and g4, and sheet discharging outlet 103b.

Moreover, at the rear portion of the printer head 121 (i.e., under the printer head 121 in FIG. 14), a sheet detecting switch 135 is provided so as to contact the printer head 121 when the printer head 121 is retreated by the sheet to be transported.

For adjusting the tension of the ink ribbon 125, rollers r1 and r2 are provided to be pressed against the ink ribbon 125 by springs s1 and s2, with rollers r3 and r4 being also held in contact with the ribbon 125.

Meanwhile, in the copying apparatus main body 101, at the side opposite to the side where the printer head 121 is provided as described above, there are provided an image reading means including a light source 120 for projecting light onto an original document DO through a opening 110a formed in the bottom wall 110b of the main body 101, a lens 130 through which light reflected from the original document DO is passed, and a photosensing portion 140 composed of an image sensor, etc., and a timing roller 150 contacting the original document DO pressed against the undersurface of the bottom wall 110b so as to be rotated by friction with respect to the original document following the movement of the copying apparatus main body 101 for detecting the speed of displacement of the main body 101, and another roller 160 following rotation of the roller 150 and provided with a speed sensor 170 for detecting the rotational speed of the timing roller 150 generally in the similar manner as in the first and second embodiments described earlier.

It may be so arranged that the printer head 121 is directly actuated according to the image information from the photosensing portion 140 or that light signal detected by the photosensing portion 140 is once stored in the memory of a micro-computer 127 so as to derive the stored content during copying reproduction for driving, the printer head 121 and platen roller L according to the information.

Hereinbelow, description will be given with respect to the case where transfer is effected onto a small-sized card type transfer sheet through employment of the copying apparatus according to the third embodiment of the present invention described so far.

For the purpose, the protective cover member 103 is applied onto the copying apparatus main body 101, as shown in FIG. 14. In this case, a protrusion 144 provided on the inner lower wall adjacent to the open end of the protective cover 103 is fitted into a recess or groove 145 formed at the corresponding portion of the copying apparatus main body 101 so as to prevent the protective cover member 103 from being disengaged accidentally.

In the above state, the operator holds the copying apparatus main body 101 by hand, with its lower end face 101b contacting the original document DO, and slidingly displaces the main body 101 in a direction, for example, indicated by the arrow F, whereby the timing roller 150 contacting the original document DO is rotated, and the original document DO is subjected to the exposure and scanning according to the rotation starting signal from the speed sensor 170 which has detected the rotation of the roller 150, and light signal thereby is stored in the memory of the micro-computer 127.

Upon completion of the exposure and scanning of the original document, the operator inserts the card type transfer sheet through the inlet 103a along the guide plates g1 and g2 in the direction of the arrow PA. When the leading edge of the transfer sheet is inserted between the platen roller L and the printer head 121 at the contact portion thereof, the printer head 121 is retreated against the urging force of the spring means 122 by the thickness of the transfer sheet, so that the sheet detecting switch 131 is actuated by the contact thereof with the printer head 121. Thus, when the insertion of the transfer sheet is transmitted to the control unit (not shown), the control unit is started, and a motor (not shown) starts rotating for driving the platen roller L. In the above case, the rotational speed of the above motor is constant, and the printer head 121 is simultaneously driven according to the signal stored in the memory of the micro-computer 127.

Accordingly, the platen roller L driven by the above motor, the feed-out roller Rf connected therewith by the belt b, and also, the intermediate roller 126 contacting this feed-out roller Rf, are rotated in synchronization with the motor, and the image of the original document is successively transferred onto the transfer sheet fed out by the platen roller L. The transfer sheet thus fed out by the platen roller L is held between the feed-out roller Rf and the intermediate roller 126 so as to be discharged through the sheet discharging outlet 103b.

As described above, according to the embodiment of FIG. 14 explained so far, since the copying apparatus is arranged to automatically transfer for copying onto a small-sized card type transfer sheet, etc., any deviation due to different operators may be eliminated for the formation of accurate images.

It is to be noted here that in the embodiment of FIG. 14, although the printer head of a thermal type is employed, such printer head may be replaced by a printer head of an impact type.

Meanwhile, in the case where copying is effected onto a large-sized card which can not be inserted into the sheet inserting inlet, or onto a copy paper of a large size, the protective cover member 103 is detached, and the copying apparatus main body 101 is displaced in the direction of movement of the ink ribbon 125, with the ink ribbon 125 being pressed against the paper surface by the printer head 121. In the above case, the intermediate roller 126 is rotated through contact thereof with the paper surface, and the signal stored in the memory is derived in synchronization with the above rotation, thereby to drive the printer head 121. Thus, the image corresponding to the memory content is transferred onto the paper surface as desired.

As is clear from the foregoing description, the compact copying apparatus according to the third embodiment of the present invention is characterized in that there are provided a printer head provided at one side of a copying apparatus main body, a protective cover member detachably mounted at the one side of the main body provided with the printer head, a sheet transport passage defined between the protective cover member and the copying apparatus main body upon attachment of the protective cover member onto the copying apparatus main body, a sheet feeding means provided to confront the printer head so as to feed out the sheet inserted into the sheet transport passage at a constant speed, and an image reading means provided at the other end of the copying apparatus main body.

By the above construction, since the small-sized transfer sheet such as a card or the like inserted into the copying apparatus is automatically fed by the sheet feed-out means, any positional deviation in the transfer sheet due to manual operation of the operator, etc., may be completely eliminated, thereby making it possible to effect accurate transfer work.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A manual copying apparatus comprising an image reading means for reading an image of an original document to be copied, transfer material for printing said image thereon, a printing means for printing said image read by said image reading means onto said transfer material, arranged to subject said printing means to manual scanning in a scanning direction during the printing operation, said printing means having a printing portion held in contact with said transfer material, and a transfer material transport means detachably mounted on said manual copying apparatus, positioned to confront said printing means so as to move said transfer material in said scanning direction, with said transfer material being brought into contact with said printing portion.

2. A manual copying apparatus comprising an image reading means for reading an image of an original document to be copied, transfer material for printing said image thereon, a printing means for printing said image read by said image reading means onto said transfer material, arranged to subject said printing means to manual scanning in a predetermined scanning direction during the printing operation, said printing means having a printing point held in contact with said transfer material, and a cover structure detachably mounted on said manual copying apparatus, said cover structure including a support member for supporting said transfer material in a roll paper form, and a displaced transport roller for directing said transfer paper roll material outside said cover structure in said scanning direction, with said roll paper being held by a platen roller in contact with said printing point of said printing means.

3. An image information processing apparatus which comprises:

a main body including an image reading section for optically reading document image information from an original document, and adjacent processing means for effecting copying of said image information rom said image reading section, a protector cover member detachably mounted with respect to said main body so as to protect said image reading section when mounted, and also, to form an original document insertion gap between said protective cover member and said main body, and a reading starting switch positioned so as to be actuated automatically when an original document is inserted into said original document insertion gap, and also manually when said image reading section is positioned at an original document reading position confronting the original document, when said protective cover member is detached from said main body.

* * * * *